S. SIMON.
FLY TRAP.
APPLICATION FILED OCT. 11, 1911.
1,018,213.
Patented Feb. 20, 1912.
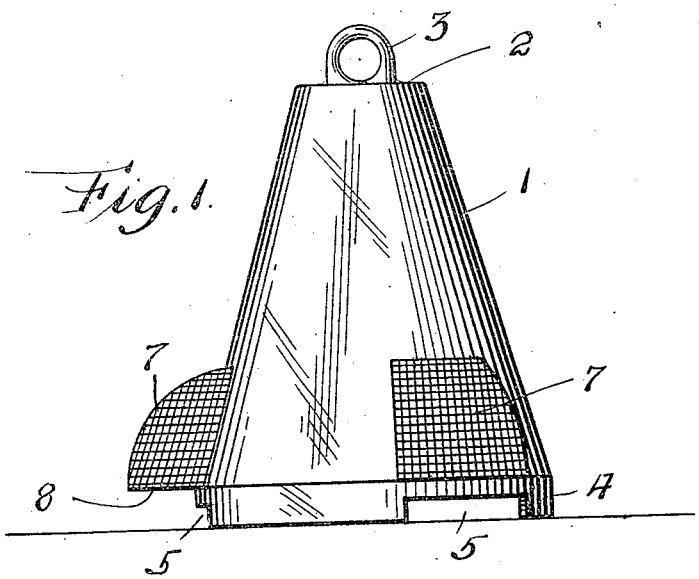
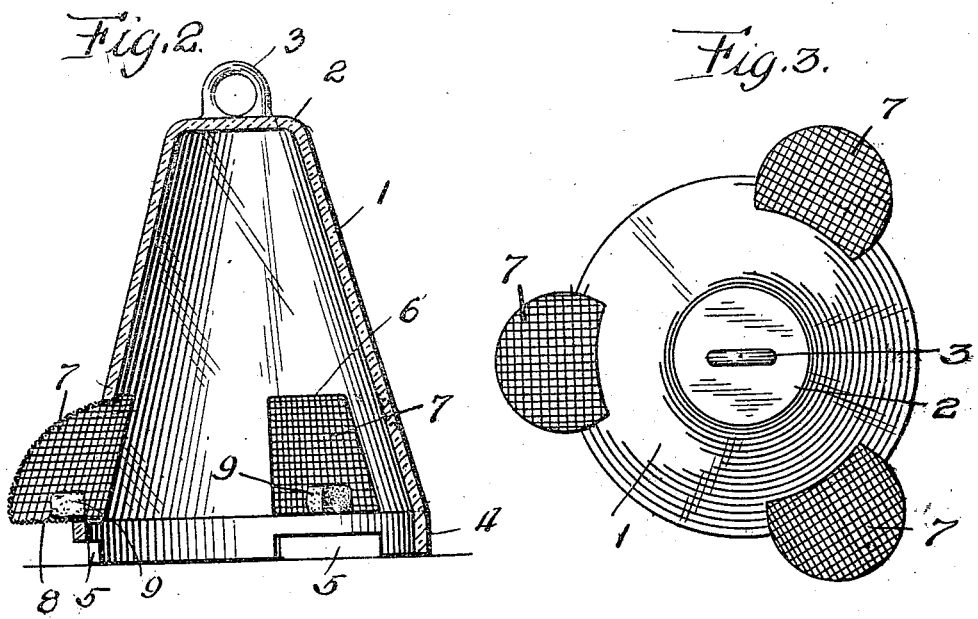
WITNESSES
Samuel Payne
Ralph C. Evert
INVENTOR
S. Simon.
BY
ATTORNEYS

UNITED STATES PATENT OFFICE.

STEVE SIMON, OF YOUNGSTOWN, OHIO.

FLY-TRAP.

1,018,213.

Specification of Letters Patent. Patented Feb. 20, 1912.

Application filed October 11, 1911. Serial No. 654,037.

*To all whom it may concern:*

Be it known that I, STEVE SIMON, a subject of the King of Hungary, residing at Youngstown, in the county of Mahoning and State of Ohio, have invented certain new and useful Improvements in Fly-Traps, of which the following is a specification, reference being had therein to the accompanying drawing.

This invention relates to fly traps, and the object of my invention is to provide a transparent trap having novel cages or bait holders adapted to attract flies and other insects to said trap to be entrapped therein.

Another object of the invention is to provide a trap of the above type that can be placed upon a suitable support or suspended from a support.

A further object of this invention is to provide a trap consisting of comparatively few parts inexpensive to manufacture, durable, and highly efficient for entrapping various kinds of insects.

I attain the above objects by a mechanical construction that will be hereinafter specifically described and then claimed.

Reference will now be had to the drawing, wherein:—

Figure 1 is a side elevation of the trap, Fig. 2 is a vertical sectional view of the same, and Fig. 3 is a plan of the trap.

A trap in accordance with this invention comprises a frusto-conical body 1 having the flat top 2 thereof provided with a central eyelet 3. This eyelet serves functionally as means for suspending the trap from a suitable support, or as a handle for manipulating the trap. The lower edges of the frusto-conical body 1 terminate in vertical walls 4 and these walls have the lower edges thereof cut away to provide equally spaced oblong openings 5 through which insects can pass to enter the hollow body 1. The body 1, including the eyelet 3, is preferably made of a transparent material, as glass and said body, above the openings 5, is provided with segment-shaped openings 6. Mounted in these openings are cages 7, preferably made of interwoven wire. The cages protrude from the openings and the horizontal portions 8 of said cages are adapted to support bait 9, as sugar, whereby insects, as flies, will be attracted to the trap. When the trap is suspended from a suitable support, it is necessary that the trap be lowered and placed upon a base to entrap the insects that enter the hollow body, and after insects have been entrapped, either with the body in a suspended position or stationary position, it is an extremely easy matter to shift the trap to a receptacle and immerse the same in water or other liquid to exterminate the life of the insects within the trap.

It is obvious that the frusto-conical shaped body can be provided with a plurality of radially disposed cages, according to the size of the same, and that by the transparency of the trap, insects will be readily attracted to those already within the body.

What I claim is:—

A fly trap comprising a hollow frusto-conical shaped body having openings adjacent to the lower terminus thereof and closed at its top, a vertically disposed cylindrical base integral with the lower terminus of said body and cut away at its lower edge to provide a series of inlet openings, cages projecting laterally from the openings of said body, and means connected with the closed top of said body to facilitate the suspending of the latter.

In testimony whereof I affix my signature in the presence of two witnesses.

STEVE SIMON.

Witnesses:
 THOS. H. JENKINS,
 ALBERT CEPEANY.